US012345235B2

(12) United States Patent
Mongeau et al.

(10) Patent No.: US 12,345,235 B2
(45) Date of Patent: Jul. 1, 2025

(54) METHOD FOR REDUCING GEAR INDUCED NOISE FROM A WIND TURBINE

(71) Applicant: VESTAS WIND SYSTEMS A/S, Aarhus N (DK)

(72) Inventors: Peter Mongeau, Center Conway, NH (US); Kent Tange, Ry (DK); Andreas Langbak, Aalborg (DK); Tobias Philipp Roman Duda, Lübeck (DE)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/885,351

(22) Filed: Sep. 13, 2024

(65) Prior Publication Data

US 2025/0188903 A1    Jun. 12, 2025

Related U.S. Application Data

(60) Provisional application No. 63/609,074, filed on Dec. 12, 2023.

(30) Foreign Application Priority Data

Jan. 18, 2024    (DK) .......................... PA 2024 30025

(51) Int. Cl.
*F03D 7/02*    (2006.01)
*F03D 15/00*    (2016.01)
(Continued)

(52) U.S. Cl.
CPC .......... *F03D 7/0296* (2013.01); *F03D 15/00* (2016.05); *F03D 17/015* (2023.08);
(Continued)

(58) Field of Classification Search
CPC ...... F03D 7/0296; F03D 15/00; F03D 17/015; F03D 17/033; F03D 80/005; F05B 2260/4031; F05B 2260/96
See application file for complete search history.

(56) References Cited

U.S. PATENT DOCUMENTS

| | | | |
|---|---|---|---|
| 2005/0284225 A1* | 12/2005 | Luo .......................... | F03D 15/10 73/593 |
| 2012/0029838 A1* | 2/2012 | Hallman ................. | F03D 15/00 702/34 |

(Continued)

FOREIGN PATENT DOCUMENTS

| | | |
|---|---|---|
| CN | 109386436 A | 2/2019 |
| WO | 2023117019 A1 | 6/2023 |
| WO | 2023213367 A1 | 11/2023 |

OTHER PUBLICATIONS

Danish Patent and Trademark Office, 1st Technical Examination including the Search Opinion and Search Report for Application PA 2024 30025 dated Jul. 15, 2024.

(Continued)

*Primary Examiner* — David E Sosnowski
*Assistant Examiner* — Aye S Htay
(74) *Attorney, Agent, or Firm* — Patterson + Sheridan, LLP

(57) ABSTRACT

A method for reducing gear induced noise from a wind turbine is disclosed. A first vibration map and a second vibration map are generated, specifying, for each of a plurality of operating points of the generator, a virtual phase of vibrations originating from gear tooth meshing of the gearbox, relative to a first and second reference phase, at the respective operating points. An overlap between operating points of the first vibration map and operating points of the second vibration map is identified and virtual phases within the overlap are compared, thus deriving a phase offset (Continued)

between the first vibration map and the second vibration map. The virtual phase of vibrations of each of the operating points of the second vibration map are adjusted according to the phase offset, so as to align the first vibration map and the second vibration map, and the first vibration map and the second vibration map are combined into a resultant vibration map.

11 Claims, 6 Drawing Sheets

(51) Int. Cl.
   *F03D 17/00* (2016.01)
   *F03D 80/00* (2016.01)
(52) U.S. Cl.
   CPC ......... *F03D 17/033* (2023.08); *F03D 80/005* (2023.08); *F05B 2260/4031* (2013.01); *F05B 2260/96* (2013.01)

(56) References Cited

U.S. PATENT DOCUMENTS

2019/0078974 A1* 3/2019 Nowoisky ........... G01M 13/021
2019/0154007 A1* 5/2019 Ramakrishnan ......... G01H 1/16

OTHER PUBLICATIONS

European Search Report and Search Opinion Received for EP Application No. 24218549.4, mailed on May 2, 2025, 5 pages.

* cited by examiner

FIG. 5

| phase of vibration vector as determined by the GMAE | | | | | | | | | | | | | | | | | | | | |
|---|---|---|---|---|---|---|---|---|---|---|---|---|---|---|---|---|---|---|---|---|
| ph ref #1 | Speed(rpm) | | | | | | | | | | | | | | | | | | | |
| Torque (kNm) | 20 | 40 | 60 | 80 | 100 | 120 | 140 | 160 | 180 | 200 | 220 | 240 | 260 | 280 | 300 | 320 | 340 | 360 | 380 | 400 |
| 10 | 170 | 155 | 80 | 55 | 50 | 125 | 190 | 310 | 155 | 225 | 115 | 150 | 300 | | | | | | | |
| 20 | 160 | 80 | 215 | 125 | 160 | 125 | 285 | 280 | 255 | | | | | | | | | | | |
| 30 | 125 | 305 | 95 | 250 | 0 | 285 | 115 | 350 | 335 | | | | | | | | | | | |
| 40 | 60 | 0 | 310 | 295 | 70 | 155 | 235 | 125 | 285 | | | | | | | | | | | |
| 50 | 30 | 55 | 120 | 185 | 95 | 260 | 315 | 130 | 330 | | | | | | | | | | | |
| 60 | 265 | 190 | 320 | 195 | 85 | 305 | 125 | 25 | 350 | | | | | | | | | | | |
| 70 | 200 | 335 | 120 | 285 | 330 | 335 | 180 | 0 | 115 | | | | | | | | | | | |
| 80 | 220 | 215 | 185 | 310 | 60 | 180 | 60 | 50 | 160 | 290 | 70 | 140 | 275 | | | | | | | |
| 90 | 255 | 245 | 70 | 85 | 260 | 105 | 270 | 240 | 90 | 170 | 320 | 205 | 350 | | | | | | | |
| 100 | 180 | 295 | 305 | 165 | 115 | 320 | 325 | 180 | 65 | 315 | 185 | 5 | 10 | | | | | | | |
| 110 | 215 | 90 | 95 | 240 | 155 | 80 | 110 | 350 | 220 | 165 | 125 | 85 | 250 | | | | | | | |
| 120 | 95 | 30 | 295 | 10 | 160 | 80 | 245 | 40 | 80 | 70 | 65 | 155 | 315 | 85 | 195 | | | | | |
| 130 | | | | | | | 350 | 315 | 310 | 215 | 110 | 345 | 330 | 85 | 265 | 40 | 130 | 215 | 345 | 205 |
| 140 | | | | | | | 15 | 210 | 40 | 285 | 185 | 5 | 340 | 195 | 285 | 85 | 240 | 205 | 95 | 180 |
| 150 | | | | | | | 30 | 165 | 315 | 70 | 110 | 265 | 30 | 95 | 295 | 255 | 335 | 65 | 325 | 240 |
| 160 | | | | | | | 270 | 310 | 190 | 195 | 110 | 350 | 130 | 330 | 40 | 260 | 205 | 15 | 175 | 160 |
| 170 | | | | | | | | | | | | | | 95 | 195 | 335 | 45 | 85 | 185 | 285 |
| 180 | | | | | | | | | | | | | | 130 | 105 | 45 | 315 | 70 | 245 | 125 |
| 190 | | | | | | | | | | | | | | 205 | 165 | 285 | 75 | 135 | 45 | 95 |
| 200 | | | | | | | | | | | | | | 50 | 270 | 325 | 305 | 315 | 70 | 60 |
| 210 | | | | | | | | | | | | | | 35 | 180 | 160 | 310 | 280 | 115 | 55 |

FIG. 6

METHOD FOR REDUCING GEAR INDUCED NOISE FROM A WIND TURBINE

FIELD OF THE INVENTION

The present invention relates to a method for reducing gear induced noise from a wind turbine. More particularly, the method according to the invention allows gear induced noise to be reduced efficiently and reliably across the entire operating range of the wind turbine.

BACKGROUND OF THE INVENTION

When operating a wind turbine, various movable parts of the wind turbine generate structure-borne vibrations and associated air-borne noise, which may be amplified by various other structures of the wind turbine, such as tower, wind turbine blades, etc. This is sometimes referred to as tonality. This may result in air-borne noise levels in the vicinity of the wind turbine which annoy neighbours or disturb animal life, and the noise may even approach or exceed allowable noise limits. It is therefore desirable to reduce such noise.

One source of wind turbine noise is vibrations originating from operation of the generator. Another source is vibrations originating from the drive train, e.g. from gear tooth meshing in the gearbox. In combination, vibrations originating from the generator and vibrations originating from the drive train constitute vibrations of the power train of the wind turbine, and thereby noise of the wind turbine as a whole.

In order to mitigate the part of the vibrations which originates from gear tooth meshing in the gearbox, it may be desirable to track the gear tooth meshing angle. However, this would normally require measurements at interior positions of the gearbox during operation, and this is considered cumbersome and technically challenging.

DESCRIPTION OF THE INVENTION

It is an object of embodiments of the invention to provide a method for reducing gear induced noise from a wind turbine in a fast, efficient and reliable manner.

It is a further object of embodiments of the invention to provide a method for reducing gear induced noise from a wind turbine in an accurate and efficient manner, without requiring knowledge of an absolute gear tooth meshing angle.

The invention provides a method for reducing gear induced noise from a wind turbine, the wind turbine comprising a rotor, a generator and a gearbox interconnecting the rotor and the generator, the method comprising the steps of:
  during operation of the wind turbine, generating a first vibration map specifying, for each of a plurality of operating points of the generator, a virtual phase of vibrations originating from gear tooth meshing of the gearbox, relative to a first reference phase, at the respective operating points, each operating point being defined by a rotational speed and a torque of the generator,
  at a later point in time, operating the wind turbine and generating a second vibration map specifying, for each of a plurality of operating points of the generator, a virtual phase of vibrations originating from gear tooth meshing of the gearbox, relative to a second reference phase, at the respective operating points,
  identifying an overlap between operating points of the first vibration map and operating points of the second vibration map,
  for at least some of the operating points within the identified overlap, comparing the virtual phase of vibrations of the first vibration map and the virtual phase of vibrations of the second vibration map, and deriving a phase offset between the first vibration map and the second vibration map, based on the comparison,
  adjusting the virtual phase of vibrations of each of the operating points of the second vibration map by a value corresponding to the derived phase offset, so as to align the first vibration map and the second vibration map,
  combining the first vibration map and the second vibration map into a resultant vibration map, and
  controlling operation of the generator in accordance with the resultant vibration map.

Thus, the method according to the invention is a method for reducing gear induced nose from a wind turbine, the wind turbine comprising a rotor, a generator and a gearbox interconnecting the rotor and the generator. Thus, during operation of the wind turbine, wind acts on the rotor and causes the rotor to rotate. The rotational movement of the rotor is transmitted to the generator, via the gearbox, and transformed into electrical energy which may be supplied to a power grid. Accordingly, the gearbox is connected to the rotor via a low speed shaft and to the generator via a high speed shaft, and the gearbox comprises a number of gear stages of meshing gears.

In the present context the term 'gear induced noise' should be interpreted to means noise perceived at a given position at or near the wind turbine, and which originates from operation of the gearbox of the wind turbine, e.g. from gear meshing.

In the method according to the invention, the wind turbine is initially operated in a normal manner. During this, a first vibration map is generated. The first vibration map specifies, for each of a plurality of operating points of the generator, a virtual phase of vibrations originating from gear tooth meshing of the gear box, relative to a first reference phase, at the respective operating point.

In the present context the term 'operating point of the generator' should be interpreted to mean a combination of a rotational speed and a torque of the generator, at which the generator operates.

Thus, for each combination of rotational speed and torque at which the generator operates, a virtual phase of vibrations originating from gear tooth meshing of the gearbox, relative to a first reference phase, is obtained. This results in a first vibration map, e.g. in the form of a table, with correlated or mutually corresponding values of rotational speed of the generator, torque of the generator and virtual phase of vibrations originating from the gear tooth meshing of the gearbox. Accordingly, for each operating point of the generator, in the form of a rotational speed-torque pair, at which the wind turbine is operated, a virtual phase is specified. This constitutes the first vibration map.

Throughout the first vibration map, the virtual phases specified are phases relative to a first reference phase. Accordingly, the specified virtual phases do not represent an actual physical and absolute phase of the gear tooth meshing of the gearbox, but rather represents a phase relative to a, possibly arbitrarily selected, starting point, in the form of the first reference phase. However, since the virtual phases specified for each of the operating points of the generator forming part of the first vibration map refers to the same starting point, i.e. to the first reference phase, they are all comparable.

At a later point in time, the wind turbine is again operated in a normal manner. While the wind turbine is operated, a second vibration map is generated, similarly to the first vibration map described above. Thus, the remarks set forth above are equally applicable here.

However, the virtual phases specified in the second vibration map represent phases of the gear tooth meshing relative to a second reference phase instead of relative to the first reference phase. Accordingly, the second vibration map is not readily compatible with the first vibration map, since the virtual phases specified in the respective vibration maps are not referring to the same reference phase.

Next, an overlap between operating points of the first vibration map and operating points of the second vibration map is identified. Accordingly, at least one operating point, in the form of a rotational speed-torque pair of the generator, is identified which is included in the first vibration map as well as in the second vibration map.

The overlap may cover the entire second vibration map in the sense that all of the operating points of the second vibration map also form part of the first vibration map. In this case the first vibration map may comprise further operating points, in which case the operating points of the second vibration map may be regarded as a subset of the operating points of the first vibration map. In a similar manner, the overlap may cover the entire first vibration map and the second vibration map may comprise further operating points. Alternatively, the overlap may cover the entire first vibration map as well as the entire second vibration map.

As another alternative, the overlap may form a subset of the first vibration map as well as of the second vibration map. In this case each of the first vibration map and the second vibration map may comprise operating points which do not form part of the other vibration map.

In any event, the identified overlap represents one or more operating points at which the generator has been operated during generation of the first vibration map as well as during generation of the second vibration map.

Next, for at least some of the operating points within the identified overlap, the virtual phase of vibrations of the first vibration map and the virtual phase of vibrations of the second vibration map are compared. Since the operating points of the overlap represent similar operating conditions, the virtual phase of vibrations of the first and second vibration maps, respectively, related to these operating points may also be regarded as having been obtained under similar operating conditions. Accordingly, for a given operating point, a difference between the virtual phase of vibrations appearing in the first vibration map and the virtual phase of vibrations appearing in the second vibration map can be assumed to be due to, entirely or at least primarily, the fact that the virtual phases of the first vibration map refer to the first reference phase while the virtual phases of the second vibration map refer to the second reference phase.

Thus, based on the comparison, a phase offset between the first vibration map and the second vibration map is derived. The derived phase offset may be regarded as representing a difference between the first reference phase and the second reference phase.

Next, the virtual phase of vibrations of each of the operating points of the second vibration map is adjusted by a value corresponding to the derived phase offset. This essentially eliminates the difference between the virtual phases of the first vibration map and of the second vibration map, caused by the reference to the first reference phase and the second reference phase, respectively, and therefore the adjusted virtual phases of the second vibration map are now directly compatible with the virtual phases of the first vibration map, and the first vibration map and the second vibration map may therefore be regarded as being aligned.

Accordingly, the first vibration map and the second vibration map, with the adjusted virtual phases of vibrations, are now combined into a resultant vibration map. Thus, the data originating from the first vibration map and the data originating from the second vibration map are merged to form one single resultant vibration map, and the data available in the resultant vibration map can be assumed to exceed the data available in the first vibration map as well as the data available in the second vibration map. Thus, the resultant vibration map may be regarded as being more comprehensive than each of the first vibration map and the second vibration map. Furthermore, due to the adjustment of the second vibration map, the resultant vibration map may appear as if it was generated in one go, instead of in two steps represented by the first vibration map and the second vibration map, respectively.

For instance, in the case that the first vibration map as well as the second vibration map comprises operating point which do not form part of the other vibration map, then the resultant vibration map will comprise more operating points than the first vibration map as well as more operating points than the second vibration map. Accordingly, in this case the resultant vibration map covers a larger part of the total operating range of the generator than each of the first vibration map and the second vibration map on its own. This may be regarded as 'stitching' the vibration maps together so as to form a larger resultant vibration map.

Furthermore, within the overlap region the data of the resultant vibration map becomes more robust, since it relies on data from the first vibration map as well as data from the second vibration map.

Finally, the operation of the generator is controlled in accordance with the resultant vibration map. Accordingly, the generator is operated in accordance with the extensive, accurate and reliable data regarding virtual phase of vibrations being available in the resultant vibration map. This allows the generator to be operated in such a manner that observed vibrations originating from the gearbox can be taken into account and minimised or counteracted. Moreover, this may be obtained shortly after restarting the wind turbine, e.g. as soon as data obtained during operation of the wind turbine has been aligned with the already existing resultant vibration map, because a vast amount of previously obtained data can be readily applied once alignment with regard to phase offset has been performed.

The step of controlling operation of the generator may comprise generating a torque modulating signal based on the virtual phase of vibrations of the resultant vibration map, corresponding to a current operating point of the generator, and injecting the torque modulating signal into the generator.

In the present context the term 'torque modulating signal' should be interpreted to mean a control signal which defines an AC torque sinus which can be added on top of a DC power producing torque of the generator. Accordingly, a torque modulating signal being applied to the generator modulates the torque output of the generator. Thus, according to this embodiment, the operation of the generator is controlled in such a manner that the AC sinus part of the torque of the generator, when the generator operates at a given operating point, takes the virtual phase of vibrations specified for that operating point in the resultant vibration map into account. Accordingly, the generator is operated in such a manner that the expected vibrations of the gearbox, under the given circumstances, are minimised or counteracted.

Thus, the step of generating a torque modulating signal may comprise specifying a phase angle and an amplitude which results in a minimised observed vibration originating from the gearbox.

The step of generating the first vibration map and/or the step of generating the second vibration map may comprise monitoring an angular position of a high speed shaft and/or a low speed shaft of the gearbox, estimating a virtual gear tooth meshing angle of the gearbox, based on the monitored angular position of the high speed shaft and/or the low speed shaft, and deriving the virtual phase of vibrations from the estimated virtual gear tooth meshing angle.

According to this embodiment, a virtual gear tooth meshing angle of the gearbox is estimated, and the virtual phase of vibrations is derived therefrom. In the present context the term 'gear tooth meshing angle' should be interpreted to mean a relative position between meshing gear teeth along a cycle or period of gear tooth meshing.

In order to estimate the virtual gear tooth meshing angle, an angular position of a high speed shaft and/or a low speed shaft of the gearbox is monitored. This could, e.g., be done by means of a suitable encoder or another relevant kind of sensor being capable of keeping track of the rotational movements of the relevant shaft.

Next, a virtual gear tooth meshing angle of the gearbox is estimated, based on the monitored angular position of the high speed shaft and/or the low speed shaft. The thus estimated gear tooth meshing angle is 'virtual' in the sense that it does not refer to an actual, physical gear meshing angle, but may, e.g., refer to an arbitrary reference angle. Furthermore, the estimated virtual gear tooth meshing angle is 'virtual' in the sense that it, contrary to the actual, physical gear tooth meshing angle, has a fixed progression along its period and is not subject to gear mesh transmission error. In the present context the term 'transmission error' should be interpreted to mean a physical characteristic for the gearbox, in the form of a difference in torsional vibration of two meshing gears, scaled so as to represent linear motion along the line of action, and where the internal components of the gearbox, e.g., elastically 'wind-up' and twist relative to each other as a function of torque load.

Three distinct types of transmission error may be relevant:
1. Geometric transmission error given by deviations of the tooth profiles from ideal involute.
2. Static transmission error including elastic deformation of teeth. Thus, static transmission error is load dependent.
3. Dynamic transmission error including inertial as well as stiffness effects. Thus, dynamic transmission error is speed dependent as well as load dependent.

However, the virtual gear tooth meshing angle represents a perfect gear meshing angle, e.g. without transmission errors, integration errors, etc., which has the exact same periodicity as the actual, physical gear tooth meshing angle, without being tied to the exact position of the actual physical gear tooth meshing angle, which is subject to, e.g., transmission error. Therefore the virtual gear tooth meshing angle can be used for describing gear tooth driven vibrations which have the same periodicity, and the virtual phase of vibrations can suitably be derived therefrom.

The concept of using a virtual gear tooth meshing angle for describing gear mesh related vibrations is not trivial. Although the gear mesh in any gearbox has a very well defined and exact ratio between the gear mesh period and that of the low speed shaft and/or the high speed shaft, the physical gear tooth meshing angle does not follow an exact, smoothly increasing periodic angle. For instance, the rolling line contact in the gear mesh surfaces is not perfect, and therefore it is not possible for the physical gear tooth meshing angle to provide a perfect and smooth progression function, even under ideal conditions. Furthermore, the gear mesh surfaces tend to deform under load, thus making these gear tooth meshing angle perturbations further from being perfect. Finally, the torsional wind-up of elements within the drivetrain, e.g. due to transmission error as described above, further disturb a perfect progression of gear tooth meshing angle. The inventors of the present invention have surprisingly realised that the ideal virtual gear tooth meshing angle described above is able to describe a single and perfect angle that, itself, is not subject to the physical errors, such as transmission errors, and that this can be used as a universal and perfect reference for gear mesh related vibrations.

The step of estimating a virtual gear tooth meshing angle of the gearbox may comprise the steps of:
  selecting an initial reference virtual gear tooth meshing angle of the gearbox,
  estimating a virtual gear tooth meshing angle relative to the reference gear tooth meshing angle, based on the monitored angular position of the high speed shaft and/or the low speed shaft and on information regarding topology of the gearbox,
  calculating a number of full rotations of the high speed shaft and/or the low speed shaft which corresponds to an integer number of full periods of gear meshing of the gearbox, based on information regarding topology of the gearbox, and
  resetting the reference virtual gear tooth meshing angle each time the high speed shaft and/or the low speed shaft has performed the calculated number of full rotations, and continuing monitoring the angular position of the high speed shaft and/or the low speed shaft and continuing estimating the virtual gear tooth meshing angle relative to the reset reference virtual gear tooth meshing angle.

According to this embodiment, the virtual gear tooth meshing angle of the gearbox is estimated in the following manner. Initially, an initial reference virtual gear tooth meshing angle of the gearbox is selected. The initial reference virtual gear tooth meshing angle serves as a reference point or starting point for an evolving gear tooth meshing angle. However, it is 'virtual' in the sense that it is not directly linked to an actual, physical gear tooth meshing angle in the gearbox, and knowledge regarding the actual, physical relative positions of the meshing gear teeth is not required in order to select the initial reference virtual gear tooth meshing angle.

Next, the virtual gear tooth meshing angle is estimated, relative to the reference virtual gear tooth meshing angle. Thus, the estimated virtual gear tooth meshing angle refers to the initially selected reference virtual gear tooth meshing angle, and not to an actual, physical reference angle. The estimation of the virtual gear tooth meshing angle is performed based on the monitored angular position of the high speed shaft and/or the low speed shaft and on information regarding topology of the gearbox.

The topology of the gearbox, such as gear ratio, number of gear stages, number of meshing gear teeth of the various stages, etc., defines how the rotational movements of the rotor are transferred to the generator. For instance, the topology of the gearbox is highly relevant with regard to mutual relationships between rotations of the low speed shaft, rotations of the high speed shaft, gear tooth meshing, etc. Therefore, based on the monitored angular position of the low speed shaft and/or the high speed, and applying knowledge regarding the topology of the gearbox, it is possible to estimate how much the gear tooth meshing angle has moved relative to the reference virtual gear tooth meshing angle, when the angular position of the low speed shaft and/or the high speed shaft has moved a certain angular distance. Accordingly, this alone would allow for tracking of the gear tooth meshing angle, at least with respect to an arbitrary starting point or reference point.

However, due to integration errors of the gearbox, such tracking of the virtual gear tooth meshing angle will eventually accumulate and drift to an extent where it fails to accurately correspond to evolution of the actual, physical gear tooth meshing angle. In order to avoid this, the following process may be performed.

Initially, a number of full rotations of the high speed shaft and/or the low speed shaft which corresponds to an integer number of full periods of gear meshing of the gearbox is calculated, based on information regarding topology of the gearbox. For instance, information regarding gear ratio of the gearbox may be relevant for calculating the number of full rotations, also when the gear ratio is a non-integer gear ratio. This will be described in further detail below. Thus, the calculated number specifies that when the high speed shaft and/or the low speed shaft has performed a corresponding number of full rotations, it can be expected that the gear meshing of the gearbox has also moved through an integer number of full periods. Accordingly, the gear meshing may be expected to be back at a position corresponding to the reference virtual gear tooth meshing angle.

Accordingly, each time the high speed shaft and/or the low speed shaft has performed the calculated number of full rotations, the reference virtual gear tooth meshing angle is reset. Subsequently, the monitoring of the angular position of the high speed shaft and/or the low speed shaft is continued, and the estimation of the virtual gear tooth meshing angle, based on the monitored angular position of the high speed shaft and/or the low speed shaft, in the manner described above, is also continued. However, the virtual gear tooth meshing angle is now estimated relative to the reset reference virtual gear tooth meshing angle.

This efficiently prevents that the estimated virtual gear tooth meshing angle is allowed to drift significantly relative to the evolution of the actual, physical gear meshing angle. Accordingly, even though the estimated virtual gear tooth meshing angle is not directly linked to a specific, actual and absolute gear tooth meshing angle of the gearbox, the evolvement and periodicity of the estimated virtual gear tooth meshing angle accurately corresponds to the evolvement and periodicity of the actual and absolute gear tooth meshing angle. Therefore, tracking the estimated virtual gear tooth meshing angle corresponds to accurately tracking the actual and absolute gear tooth meshing angle. Furthermore, this is obtained in an easy manner, since it requires only monitoring of the angular position of the high speed shaft and/or the low speed shaft, which can be readily obtained. In particular, no measurements at interior positions of the gearbox are required.

The topology of the gearbox may define a non-integer gear meshing ratio related to the low speed shaft and/or to the high speed shaft, the gear meshing ratio being a ratio with an integer numerator and an integer denominator, and the step of resetting the reference virtual gear tooth meshing angle may be performed each time the high speed shaft and/or the low speed shaft has performed a number of full rotations being equal to the denominator of the non-integer gear ratio.

According to this embodiment, the gear meshing ratio related to the low speed shaft and/or the gear meshing ratio related to the high speed shaft is a non-integer. In this case, if the gear tooth meshing angle is simply estimated based on the angular position of the high speed shaft and/or the low speed shaft and the non-integer gear meshing ratio, without the resetting of the reference virtual gear tooth meshing angle described above, then the estimated gear tooth meshing angle will be subject to rounding errors which may accumulate and result in substantial drifting of estimated gear tooth meshing angle relative to the actual, physical gear tooth meshing angle.

However, when the high speed shaft and/or the low speed shaft has performed a number of full rotations being equal to the integer denominator of the non-integer gear meshing ratio, then the gear tooth meshing of the gearbox will also have performed an integer number of full periods. Accordingly, when this occurs, it is a suitable time for resetting the reference virtual gear tooth meshing angle.

The step of estimating a virtual gear tooth meshing angle of the gearbox may comprise multiplying the monitored angular position and a non-integer gear meshing ratio of the gearbox. According to this embodiment, between the periodic resetting of the reference virtual gear tooth meshing angle, the virtual gear tooth meshing angle may simply be estimated from the angular position of the high speed shaft and/or the low speed shaft and a relevant known non-integer gear meshing ratio of the gearbox, e.g. the gear meshing ratio between the low speed shaft and a ring gear and/or the gear meshing ratio between the high speed shaft and a sun gear. Since the gear meshing ratio is non-integer, this estimate will introduce rounding errors, but it may still be considered an acceptable approximation during the relatively short interval between the periodic resetting of the reference virtual gear tooth meshing angle.

The gear meshing ratios may include harmonics or multiples thereof. For instance, the gear meshing ratios may be or include first order gear meshing terms, second order gear meshing terms, third order gear meshing terms, etc.

The step of monitoring the angular position of the high speed shaft and/or the low speed shaft of the gearbox may be performed by means of an incremental encoder. Incremental encoders are particularly well suited for accurately keeping track of the angular position of a rotating shaft, since they generate a pulse each time the rotating shaft has performed a full rotation. Furthermore, the incremental encoder keeps track of the angular position of the rotating shaft within the respective full rotations in the form of incremental progression steps. This is a very accurate and reliable way of keeping track of the angular position.

The method may further comprise the step of stopping and starting operation of the wind turbine after performing the step of generating the first vibration map and prior to performing the step of generating the second vibration map.

According to this embodiment, the wind turbine has been stopped and restarted during the period of time elapsing from the first vibration map was generated and until the second vibration map was generated. In this case it can be expected that the starting point for the wind turbine, when generating the second vibration map, differs from the starting point for the wind turbine, when generating the first vibration map, e.g. in the sense of the reference phase. Accordingly, the operation of the wind turbine, after the restart, is not directly compatible with the data of the first vibration map. However, since the second vibration map is combined with the first vibration map, in the manner described above, the data of first vibration map can be taken into account when controlling operation of the generator, following the restart of the wind turbine. Accordingly, appropriate operation of the generator, addressing vibrations, e.g. originating from gear tooth meshing, can be performed shortly after the restart of the wind turbine, e.g. as soon as vibration data has been aligned with the already existing vibration map.

In practice, vibration maps generated for a given finite operating period, e.g. between stop/start cycles of the wind turbine, will normally not cover the entire operating range of the wind turbine, and may therefore be regarded as partial vibration maps. In order to generate a complete vibration map, covering essentially the entire operating range of the wind turbine, e.g. for the purpose of noise reduction, it is an advantage to be able to stitch the partial vibration maps together, in the manner described above Operating points of the second vibration map may form a subset of the operating points of the first vibration map. According to this embodiment, all of the operating points of the second vibration map are also operating points included in the first vibration map. Thus, in this case the overlap between operating points of the first vibration map and operating points of the second vibration map covers the entire second vibration map, and it may be regarded as a full or complete overlap. The first vibration map may include further operating point, not included in the second vibration map, or the overlap may cover the entire first vibration map as well as the entire second vibration map.

As an alternative, the overlap between the operating points of the first vibration map and operating points of the second vibration map may be a partial overlap, in the sense that the overlap forms a subset of the first vibration map as well as a subset of the second vibration map. In this case the resultant vibration map is more comprehensive than the first vibration map as well as the second vibration map, in the sense that is covers more operating points. Accordingly, the resultant vibration map covers a larger portion of the operating range of the wind turbine. This may be regarded as 'stitching' the first vibration map and the second vibration map together, via the overlap, so as to form the resultant vibration map.

The method may further comprise the steps of:
during operation of the wind turbine, generating a third vibration map specifying, for each of a plurality of operating points of the generator, a virtual phase of vibrations originating from gear tooth meshing of the gearbox, relative to a third reference phase, at the respective operating points,
identifying an overlap between operating points of the resultant vibration map and operating points of the third vibration map,
for at least some of the operating points within the identified overlap, comparing the virtual phase of vibrations of the resultant vibration map and the virtual phase of vibrations of the third vibration map, and deriving a phase offset between the resultant vibration map and the third vibration map, based on the comparison,
adjusting the virtual phase of vibrations of each of the operating points of the third vibration map by a value corresponding to the derived phase offset, so as to align the resultant vibration map and the third vibration map, combining the resultant vibration map and the third vibration map into an updated resultant vibration map, and
subsequently controlling operation of the generator in accordance with the updated resultant vibration map.

According to this embodiment, in addition to the first vibration map and the second vibration map, yet another, third vibration map is generated, essentially in the manner described above. The virtual phases of vibrations included in the third vibration map refer to a third reference phase, which may differ from the first reference phase as well as from the second reference phase.

An overlap between operating points of the resultant vibration map and operating points of the third vibration map is identified, the virtual phases of vibrations are compared and a phase offset is derived, essentially in the manner described above with reference to the first vibration map and the second vibration map. The virtual phase of vibrations of each of the operating points of the third vibration map is then adjusted by a value corresponding to the derived phase offset, so as to align the resultant vibration map and the third vibration map, and the resultant vibration map and the third vibration map are combined into an updated resultant vibration map, essentially in the manner described above with reference to the first vibration map and the second vibration map. Finally, the operation of the generator is subsequently controlled in accordance with the updated resultant vibration map.

Thus, according to this embodiment, the resultant vibration map applied when controlling operation of the generator is even further enhanced with the data included in the third vibration map. Thus, the resultant vibration map is even more comprehensive and robust, and it may, e.g., cover an even larger portion of the operating range of the wind turbine.

The resultant vibration map may be even further enhanced by including data related to further vibration maps, such as a fourth, a fifth, a sixth, etc., vibration map.

The method may further comprise the steps providing the resultant vibration map to another similar wind turbine, and controlling operation of the generator of the other wind turbine in accordance with the resultant vibration map.

According to this embodiment, the resultant vibration map generated in the manner described above, is shared among different wind turbines. Thus, vibration data originating from measurements performed on one wind turbine is applied when controlling another wind turbine. Wind turbines being similar to each other, e.g. in the terms of wind turbine model or type, gearbox configuration, nominal power output, hub height, length of wind turbine blades, etc., may be expected to experience similar vibration patterns. It may therefore be relevant to include data originating from one wind turbine during operation of another, similar wind turbine.

BRIEF DESCRIPTION OF THE DRAWINGS

The invention will now be described in further detail with reference to the accompanying drawings in which FIGS. 3-6 illustrate vibration maps generated as part of a method according to an embodiment of the invention.

DETAILED DESCRIPTION OF THE DRAWINGS

Figure 1:
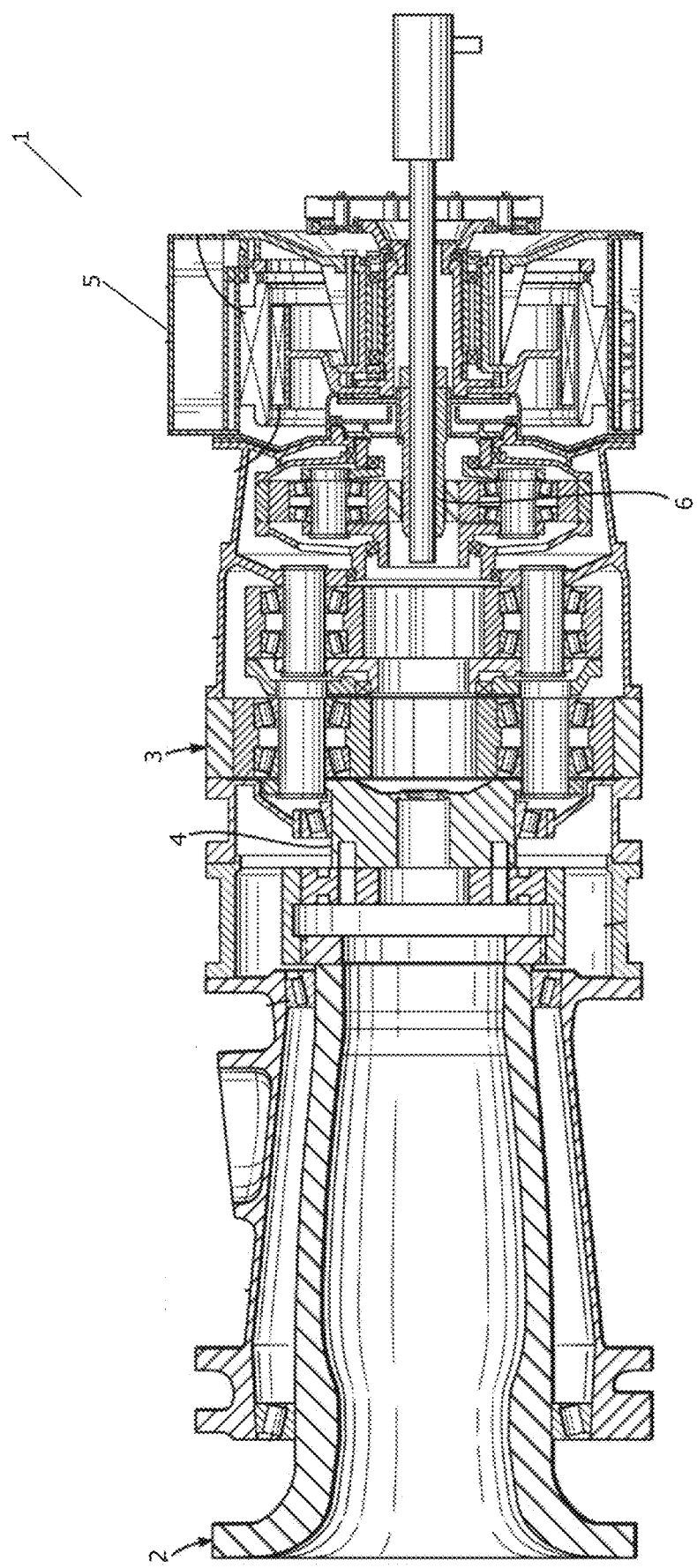
FIG. 1 is a cross sectional view of a power train of a wind turbine, being controlled in accordance with a method according to an embodiment of the invention.

FIG. 1 is a cross sectional view of a power train 1 of a wind turbine being controlled in accordance with a method according to an embodiment of the invention. The power train 1 comprises a main shaft 2 connected to a rotor (not shown) of the wind turbine, a gearbox 3 connected to the main shaft 2 via an input shaft, or low speed shaft 4, and a generator 5 connected to the gearbox 3 via an output shaft, or high speed shaft 6.

The generator 5 may be controlled in such a manner that an observed vibration originating from the gearbox 3 is minimised. This is obtained by generating a first vibration map at a first point in time and a second vibration map at a second point in time, aligning the first and second vibration maps and combining them into a resultant vibration map, and subsequently controlling operation of the generator 5 in accordance with the resultant vibration map.

The first vibration map specifies, for each of a plurality of operating points of the generator 5, a virtual phase of vibrations originating from gear tooth meshing of the gearbox 3, relative to a first reference phase. Each operating point is defined by a rotational speed and a torque of the generator 5. Similarly, the first vibration map specifies, for each of a plurality of operating points of the generator 5, a virtual phase of vibrations originating from gear tooth meshing of the gearbox 3, but in this case relative to a second reference phase.

The first vibration map and the second vibration map are aligned by identifying an overlap between operating points of the first vibration map and operating points of the second vibration map and, for at least some of the operating points within the overlap, comparing the virtual phase of vibrations of the first and second vibration maps, and deriving a phase offset between the first vibration map and the second vibration map, based on this comparison. The virtual phase of vibrations of each of the operating points of the second vibration map is then adjusted by a value corresponding to the derived phase offset, and the first vibration map and the second vibration map can now be readily combined into a resultant vibration map.

The virtual phases of vibrations of the first and second vibration maps may be derived from an estimated virtual gear tooth meshing angle which may be estimated in the following manner. An initial reference virtual gear tooth meshing angle is initially selected, and an angular position of the high speed shaft 6 and/or the low speed shaft 4 is monitored. This could, e.g., be done by means of an encoder, such as an incremental encoder.

A virtual gear tooth meshing angle relative to the reference virtual gear tooth meshing angle is then estimated, based on the monitored angular position of the high speed shaft 6 and/or the low speed shaft 4 and on information regarding topology of the gearbox 3, e.g. including information regarding a gear meshing ratio, e.g. a non-integer gear meshing ratio, of the gearbox 3. The estimated virtual gear tooth meshing angle is representative for the actual, physical gear tooth meshing angle of the gearbox 3 in the sense that it evolves essentially in the same manner as the actual, physical gear tooth meshing angle, e.g. with the same periodicity, governed by the topology of the gearbox 3. However, the estimated virtual gear tooth meshing angle refers to the selected reference virtual gear tooth meshing angle, rather than to an actual, physical reference gear tooth meshing angle. Furthermore, the estimated virtual gear tooth meshing angle may drift relative to the actual, physical gear tooth meshing angle due to integration errors and/or rounding errors. In order to prevent the estimated virtual gear tooth meshing angle from drifting unacceptably, the reference virtual gear tooth meshing angle may be periodically reset in the following manner.

A number of full rotations of the high speed shaft 6 and/or the low speed shaft 4 which corresponds to an integer number of full periods of gear meshing of the gearbox 3 is calculated, based on information regarding topology of the gearbox 3. In the case that the gearbox 3 defines a non-integer gear meshing ratio related to the low speed shaft 4 and/or to the high speed shaft 6, and the gear meshing ratio is a ratio with an integer numerator and an integer denominator, then the calculated number may be the integer denominator of the non-integer gear ratio.

When the high speed shaft 6 and/or the low speed shaft 4 has performed the calculated number of full rotations, it is known that the gear meshing of the gearbox 3 has performed an integer number of full periods, and that the position of the gears of the gearbox 3 are therefore back to the position defined by the reference virtual gear tooth meshing angle. Therefore the reference virtual gear tooth meshing angle is reset each time the high speed shaft 6 and/or the low speed shaft 4 has performed the calculated number of full rotations. Subsequently, the monitoring of the angular position of the high speed shaft 6 and/or the low speed shaft 4 and the estimation of the virtual gear tooth meshing angle are continued, but now relative to the reset reference virtual gear tooth meshing angle.

Figure 2:
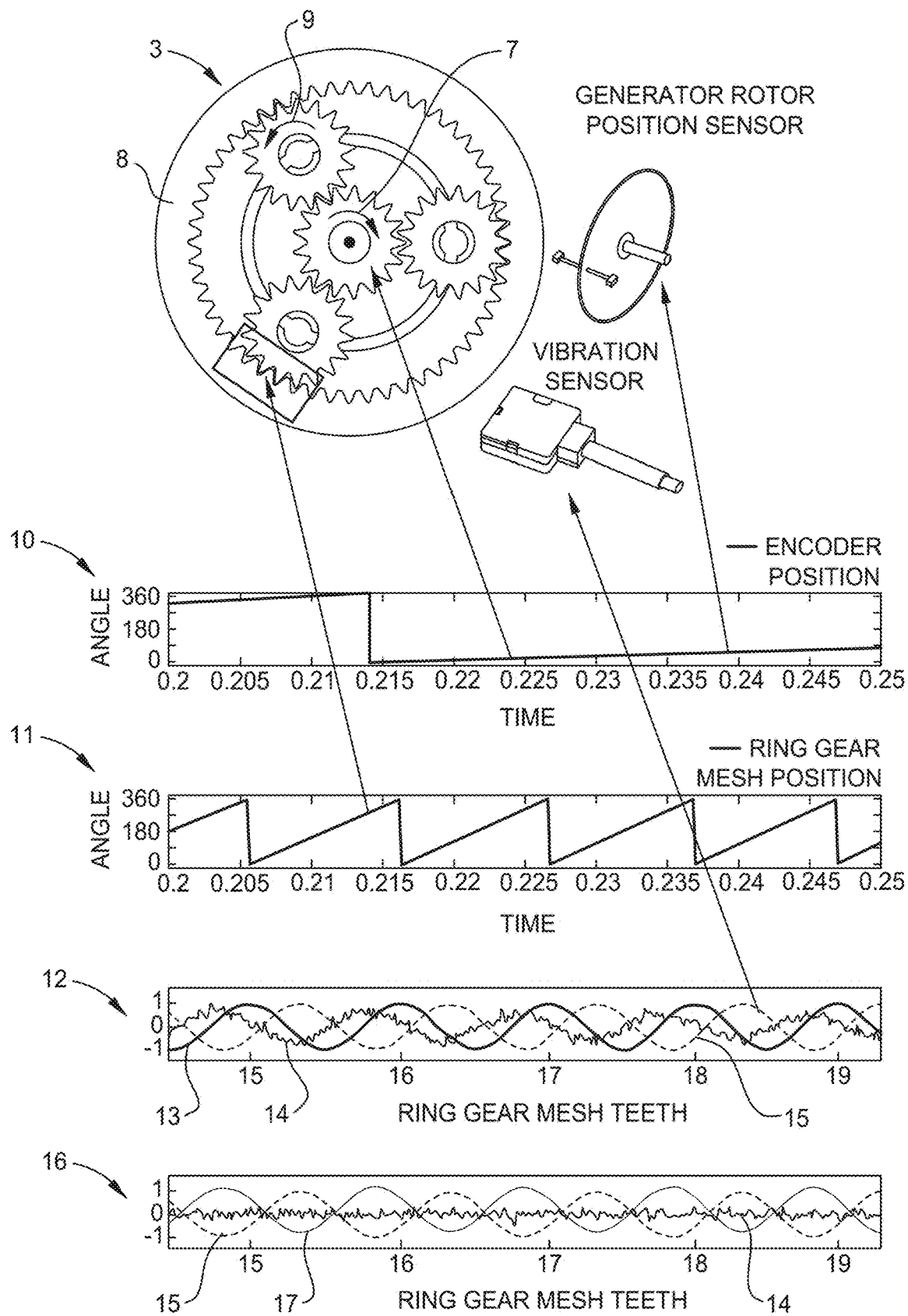
FIG. 2 illustrates tracking of a gear meshing angle as part of a method according to an embodiment of the invention.

FIG. 2 illustrates tracking of a gear tooth meshing angle as part of a method according to an embodiment of the invention. A gearbox 3 comprises a planetary gear system with a sun gear 7 connected to a high speed shaft, a ring gear 8 connected to a low speed shaft, and a planetary stage comprising three planetary gears 9 interconnecting the sun gear 7 and the ring gear 8.

The angular position of the high speed shaft, and thus of the sun gear 7, is monitored by means of an incremental encoder. The output from the incremental encoder is shown in graph 10, illustrating the angular position of the high speed shaft as a function of the time. Each time the high speed shaft has performed a full rotation, the incremental encoder generates a signal, and the angular position of the high speed shaft is reset to zero and a new revolution of the high speed shaft is commenced. This can be seen as an abrupt 'jump' shortly before t=0.215.

A gear tooth meshing angle between the ring gear 8 and the planetary gears 9 as a function of time is illustrated in graph 11. The gear tooth meshing angle illustrated in graph 11 has been calculated from the encoder output of graph 10 and information regarding a non-integer gear meshing ratio of the gearbox 3, i.e. the non-integer gear meshing ratio between the ring gear 8, and thus the low speed shaft, and the planet gear 9. Thus, graph 11 represents an estimated virtual gear tooth meshing angle. Similarly to graph 10, the gear tooth meshing angle 'resets to zero' and commences a new revolution each time a full period of virtual gear tooth meshing has been completed. It can be seen that these 'resets to zero' are not coinciding with the 'resets to zero' related to full rotations of the high speed shaft. This is due to the fact that the gear meshing ratio is a non-integer gear meshing ratio. In order to prevent the estimated virtual gear tooth meshing angle 11 from drifting relative to an actual, physical gear tooth meshing angle of the gearbox 3, e.g. due to integration errors and/or rounding errors, the reference virtual gear tooth meshing angle may be reset periodically, essentially in the manner described above with reference to FIG. 1.

Graph 12 illustrates a gear tooth meshing position 13 corresponding to estimated virtual gear tooth meshing angle 11, and an output 14 from a vibration sensor measuring observed vibrations originating from the gearbox 3. It can be seen that the output 14 from the vibration sensor follows a substantially sinusoidal curve with a periodicity corresponding to the gear tooth meshing position 13, but phase shifted relative thereto. Finally, graph 12 illustrates a virtual gearbox vibration source 15, in the form of a substantially sinusoidal curve. The virtual gearbox vibration source 15 has a periodicity corresponding to the gear tooth meshing position 13 and the output 14 from the vibration sensor, but is phase shifted relative to both of these. The virtual gearbox vibration source 15 represents a gear tooth meshing periodicity of the gearbox 3 that could be the cause of the measured output 14 from the vibration sensor, and it has been derived from the virtual gear tooth meshing position 13 and the output 14 from the vibration sensor.

All relevant vibrations or variables, e.g. torque modulation variables, are by definition occurring at the gear meshing frequency and have a vector defining an amplitude and a phase angle associated therewith. According to the present invention, the estimated virtual gear meshing angle may be applied as a reference system to which these gear mesh related vectors can be defined. For higher order gear mesh related terms, such as second order, third order, etc., the relevant frequency will be two, three, etc., times the gear meshing frequency. Similarly, the gear meshing ratio number will be two, three, etc., times that of the first order gear meshing ratio number.

Graph 16 illustrates the virtual gearbox vibration source 15 of graph 12 and a torque modulation signal 17 for a generator. The torque modulation signal 17 has been generated based on the virtual gearbox vibration source 15, and so as to have the same amplitude and be in antiphase therewith. Thus, the torque modulation signal 17 is generated in such a manner that, when it is injected into the generator, the vibrations originating from gear tooth meshing of the gearbox 3 are counteracted. Finally, graph 16 illustrates the output 14 from the vibration sensor while the torque modulation signal 17 is being injected into the generator. It can be seen that this results in a significant reduction of the measured vibration output 14.

FIGS. 3-6 illustrate various vibration maps 18, 19, 20, 21 generated as part of a method according to an embodiment of the invention. The vibration maps 18, 19, 20, 21 are shown as tables of operating points of a generator of a wind turbine, where the columns represent rotational speed of the generator and the rows represent torque of the generator. Thus, each cell of the table represents an operating point of the generator, in the form of a rotational speed-torque pair. The numbers shown in the cells represent virtual phases of vibrations originating from gear tooth meshing of the gearbox of the wind turbine, at the respective operating points.

Figure 3:
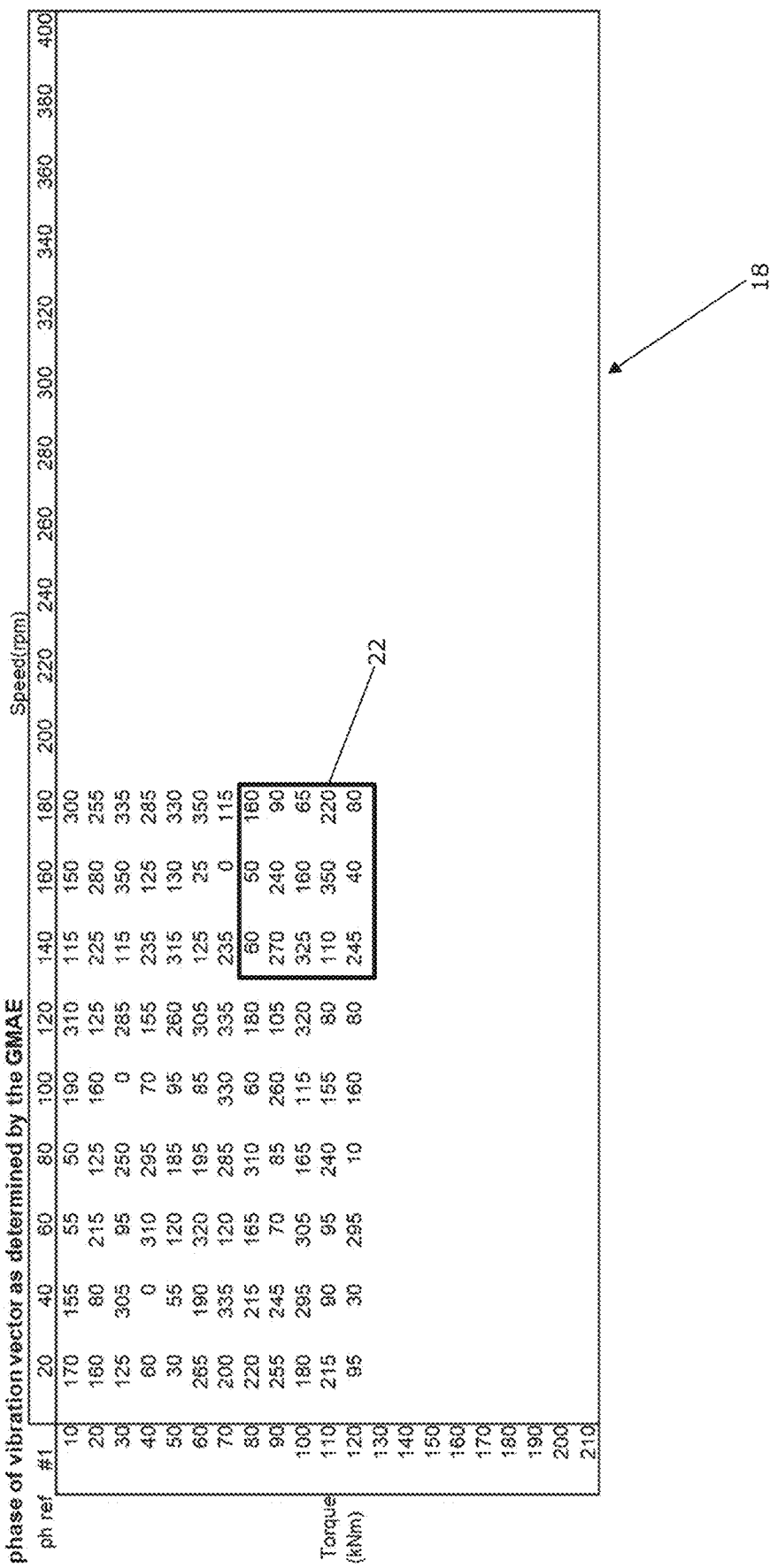

FIG. 3 shows a first vibration map 18, in which the virtual phases of vibration relate to a first reference phase. The first vibration map 18 has been generated during a first period of operation of the wind turbine. It can be seen that virtual phases have only been obtained for a subset of the operating points of the illustrated first vibration map 18, indicating that the entire operating range of the wind turbine has not been covered. Box 22 illustrates an overlap with a second vibration map. This will be described in further detail below.

Figure 4:
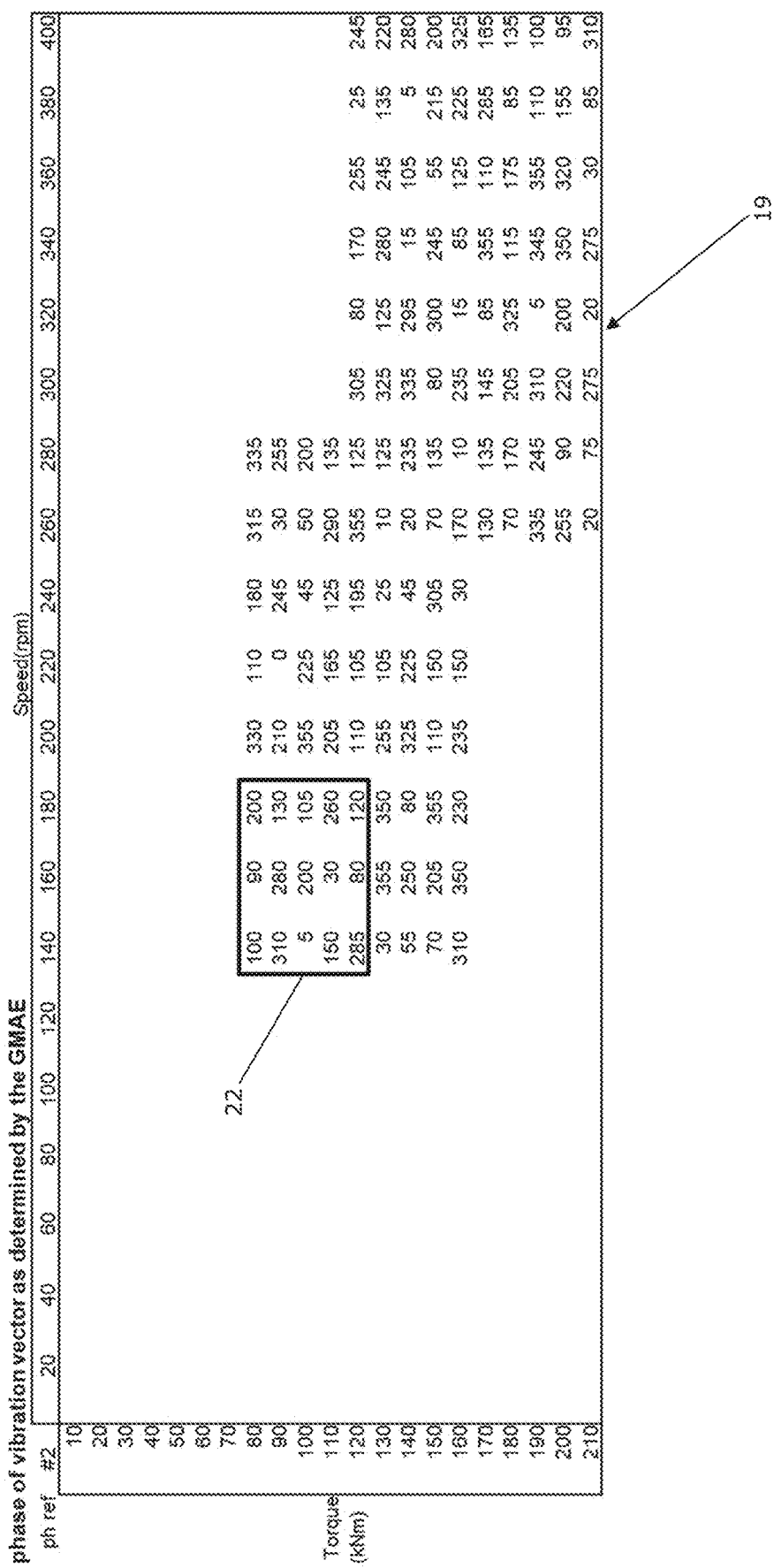

FIG. 4 shows a second vibration map 19, which has been generated during a second period of operation of the wind turbine, which is different from the first period of operation where the first vibration map 18 illustrated in FIG. 3 was generated. However, the second vibration map 19 illustrated in FIG. 4 relates to the same wind turbine as the first vibration map 18 illustrated in FIG. 3. In the second vibration map 19, the virtual phases of the vibration relate to a second reference phase which is different from the first reference phase referred to in the first vibration map 18.

It can be seen that, also in the second vibration map 19, virtual phases have only been obtained for a subset of the operating points of the vibration map 19, indicating that the entire operating range of the wind turbine has not been covered.

The operating points covered by the first vibration map 18 are not entirely coinciding with the operating points covered by the second vibration map 19. However, an overlap 22 can identified of operating points forming part of the first vibration map 18 as well as of the second vibration map 19. Accordingly, within this overlap 22 it can be expected that the wind turbine experienced similar operating conditions, and thus similar vibration conditions, during the first period of operation where the first vibration map 18 was generated and during the second period of operation where the second vibration map 19 was generated.

It can be seen that, within the overlap 22, the virtual phases of vibration included in the first vibration map 18 differ from the virtual phases of vibration included in the second vibration map 19. However, since it can be assumed that the operating conditions experienced by the wind turbine when these respective virtual phases of vibration were obtained, it can also be assumed that the differences in virtual phases of vibration between the first vibration map 18 and the second vibration map 19 are mainly, or even entirely, due to the fact that they relate to the first reference phase and the second reference phase, respectively.

Accordingly, by comparing the respective virtual phases of vibration, originating from the first vibration map 18 and the second vibration map 19, respectively, within the overlap 22, a phase offset between the first vibration map 18 and the second vibration map 19 can be derived.

Figure 5:
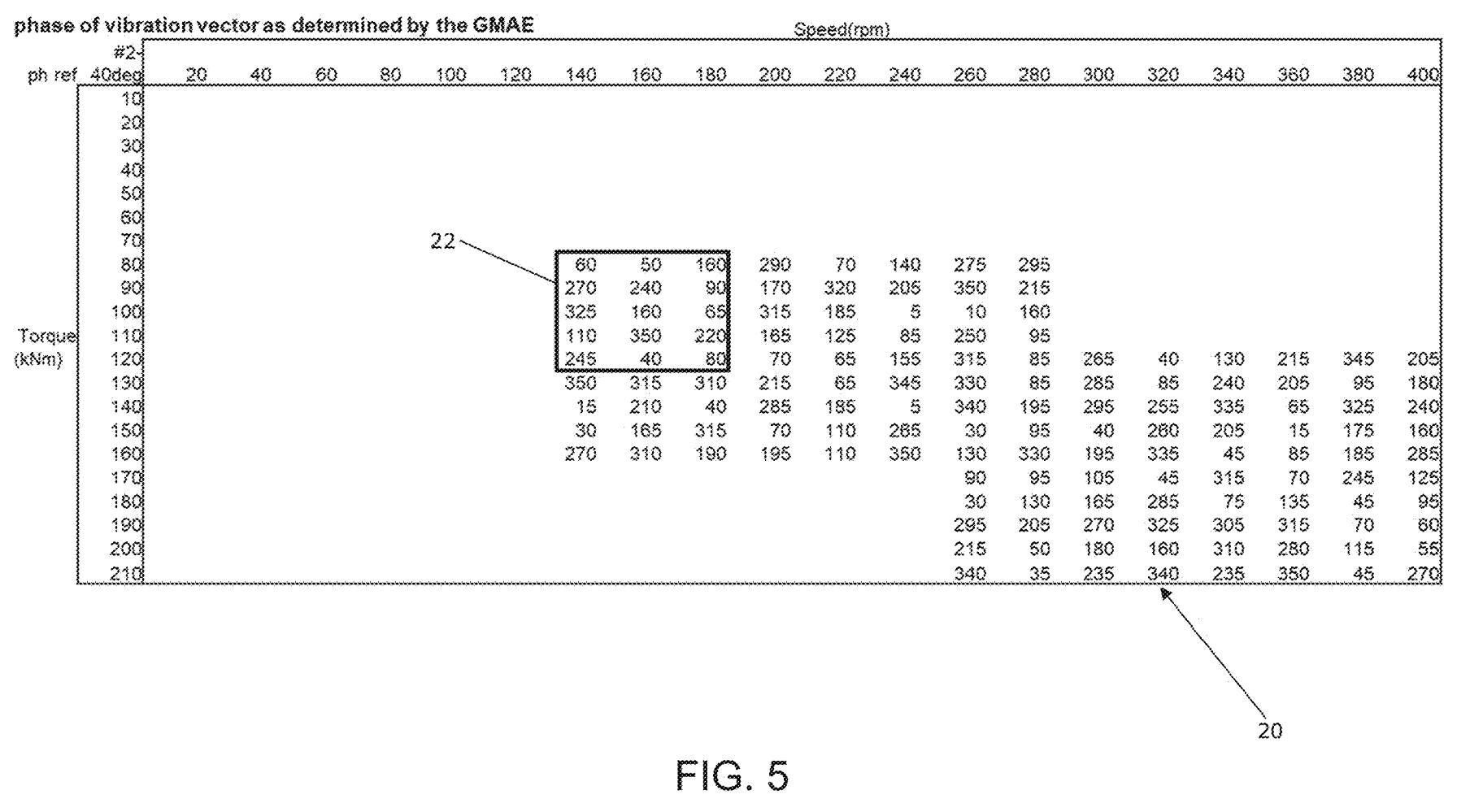

FIG. 5 illustrates an adjusted second vibration map 20. The adjusted second vibration map 20 corresponds to the second vibration map 19 illustrated in FIG. 4, but all of the virtual phases of vibration have been adjusted by a value corresponding to the phase offset between the first vibration map 18 and the second vibration map 19. It can be seen that the virtual phases of vibration within the overlap 22 now correspond to the virtual phases of vibration of the first vibration map 18. Thus, the adjusted second vibration map 20 is now aligned with the first vibration map 18.

FIG. 6 illustrates a resultant vibration map 21, in which the first vibration map 18 illustrated in FIG. 3 and the adjusted second vibration map 20 illustrated in FIG. 5 have been combined. The resultant vibration map 21 includes all the operating points included in the first vibration map 18 as well as all the operating points included in the second vibration map 19, and thus covers a larger portion of the entire operating range of the wind turbine. Using the resultant vibration map 21 for controlling operation of the generator of the wind turbine will therefore readily allow for appropriate control of the generator, e.g. in terms of mitigation of vibrations originating from the gearbox, in a larger portion of the operating range.

The invention claimed is:

1. A method for reducing gear induced noise from a wind turbine, the wind turbine comprising a rotor, a generator and a gearbox interconnecting the rotor and the generator, the method comprising:
   during operation of the wind turbine, generating a first vibration map in a form of a table specifying, for each of a plurality of operating points of the generator, a virtual phase of vibrations originating from gear tooth meshing of the gearbox, relative to a first reference phase, at the respective operating points, each operating point being defined by a rotational speed and a torque of the generator,
   at a later point in time, operating the wind turbine and generating a second vibration map in the form of a table specifying, for each of a plurality of operating points of the generator, a virtual phase of vibrations originating from gear tooth meshing of the gearbox, relative to a second reference phase that is different than the first reference phase, at the respective operating points,
   identifying an overlap between operating points of the first vibration map and operating points of the second vibration map,
   for at least some of the operating points within the identified overlap, comparing the virtual phase of vibrations of the first vibration map and the virtual phase of vibrations of the second vibration map, and deriving a phase offset between the first vibration map and the second vibration map, based on the comparison, wherein the phase offset represents a difference between the first reference phase and the second reference phase,
   adjusting the virtual phase of vibrations of each of the operating points of the second vibration map by a value corresponding to the derived phase offset, so as to align the first vibration map and the second vibration map,
   combining the first vibration map and the second vibration map into a resultant vibration map, and
   controlling operation of the generator in accordance with the resultant vibration map.

2. The method according to claim 1, wherein controlling operation of the generator comprises generating a torque modulating signal based on the virtual phase of vibrations of the resultant vibration map, corresponding to a current operating point of the generator, and injecting the torque modulating signal into the generator.

3. The method according to claim 2, wherein generating a torque modulating signal comprises specifying a phase angle and an amplitude which results in a minimized observed vibration originating from the gearbox.

4. The method according to claim 1, wherein generating the first vibration map and/or generating the second vibration map comprises monitoring an angular position of a high speed shaft and/or a low speed shaft of the gearbox, estimating a virtual gear tooth meshing angle of the gearbox, based on the monitored angular position of the high speed shaft and/or the low speed shaft, and deriving the virtual phase of vibrations from the estimated virtual gear tooth meshing angle.

5. The method according to claim 4, wherein estimating a virtual gear tooth meshing angle of the gearbox comprises:
   setting a reference virtual gear tooth meshing angle of the gearbox,
   estimating a virtual gear tooth meshing angle relative to the reference virtual gear tooth meshing angle, based on the monitored angular position of the high speed shaft and/or the low speed shaft and on information regarding topology of the gearbox,
   calculating a number of full rotations of the high speed shaft and/or the low speed shaft which corresponds to an integer number of full periods of gear meshing of the gearbox, based on information regarding topology of the gearbox, and
   resetting the reference virtual gear tooth meshing angle each time the high speed shaft and/or the low speed shaft has performed the calculated number of full rotations, and continuing monitoring the angular position of the high speed shaft and/or the low speed shaft and continuing estimating the virtual gear tooth meshing angle relative to the reference virtual gear tooth meshing angle that has been reset.

6. The method according to claim 5, wherein the topology of the gearbox defines a non-integer gear meshing ratio related to the low speed shaft and/or to the high speed shaft, the gear meshing ratio being a ratio with an integer numerator and an integer denominator, and wherein resetting the reference virtual gear tooth meshing angle is performed each time the high speed shaft and/or the low speed shaft has performed a number of full rotations being equal to the denominator of the non-integer gear meshing ratio.

7. The method according to claim 4, wherein monitoring the angular position of the high speed shaft and/or the low speed shaft of the gearbox is performed by an incremental encoder.

8. The method according to claim 1, further comprising stopping and starting operation of the wind turbine after performing the generating of the first vibration map and prior to generating the second vibration map.

9. The method according to claim 1, wherein the plurality of operating points of the second vibration map form a subset of the plurality of operating points of the first vibration map.

10. The method according to claim 1, further comprising:
    during operation of the wind turbine, generating a third vibration map in a form of a table specifying, for each of a plurality of operating points of the generator, a virtual phase of vibrations originating from gear tooth meshing of the gearbox, relative to a third reference phase, at the respective operating points,
    identifying an overlap between operating points of the resultant vibration map and operating points of the third vibration map,
    for at least some of the operating points within the identified overlap, comparing the virtual phase of vibrations of the resultant vibration map and the virtual phase of vibrations of the third vibration map, and deriving a phase offset between the resultant vibration map and the third vibration map, based on the comparison,
    adjusting the virtual phase of vibrations of each of the operating points of the third vibration map by a value corresponding to the derived phase offset, so as to align the resultant vibration map and the third vibration map,
    combining the resultant vibration map and the third vibration map into an updated resultant vibration map, and
    subsequently controlling operation of the generator in accordance with the updated resultant vibration map.

11. The method according to claim 1, further comprising providing the resultant vibration map to a second wind turbine, and controlling operation of a generator of the second wind turbine in accordance with the resultant vibration map.

\* \* \* \* \*